United States Patent

Huber et al.

[11] Patent Number: 6,103,312
[45] Date of Patent: Aug. 15, 2000

[54] PROCESS FOR THE PRODUCTION OF DECORATED TABLEWARE WITH INCREASED RESISTANCE TO SCRATCHES CAUSED BY CUTLERY

[75] Inventors: Adalbert Huber, Langen; Dietrich Speer, Langenselbold; Gabriele Wachowitz, Dietzenbach; Holger Jarnicki, Eppenrod, all of Germany

[73] Assignee: Cerdec Aktiengesellschaft Keramische Farben, Frankfurt, Germany

[21] Appl. No.: 09/166,228

[22] Filed: Oct. 5, 1998

[30] Foreign Application Priority Data

Oct. 4, 1997 [DE] Germany .......................... 197 43 852

[51] Int. Cl.⁷ ................ B05D 3/02; B05D 1/38
[52] U.S. Cl. ............... 427/419.6; 427/190; 427/193; 427/269; 427/287; 427/376.2
[58] Field of Search ..................... 427/269, 287, 427/199, 190, 193, 419.6, 376.2

[56] References Cited

U.S. PATENT DOCUMENTS

| | | | |
|---|---|---|---|
| 4,874,433 | 10/1989 | Kiss et al. ............... | 106/450 |
| 5,032,429 | 7/1991 | Diefenbach et al. ....... | 427/215 |
| 5,330,571 | 7/1994 | Speer et al. ............. | 106/450 |
| 5,589,273 | 12/1996 | Dorbath et al. .......... | 428/433 |
| 5,677,370 | 10/1997 | Huber et al. ............ | 524/490 |

FOREIGN PATENT DOCUMENTS

| | | |
|---|---|---|
| 0863187 | 9/1998 | European Pat. Off. . |
| 3719051 | 11/1988 | Germany . |
| 3809541 | 8/1989 | Germany . |
| 3835402 | 3/1990 | Germany . |
| 4411104 | 10/1995 | Germany . |
| 19709100 | 9/1998 | Germany . |
| 10-194728 | 7/1998 | Japan . |

OTHER PUBLICATIONS

Ullmann's Enzyklopädie der technischen Chemie, 4th Edition, vol. 14 (1977), pp. 9–10.

RÖMPP Chemie Lexikon, 9, (1993), pp. 2829–2830.

Lehnhäuser et al., "Beeinflussung der Glasurfärbung durch Zeolith", Keramische Zeitschrift, vol. 40, No. 7, Jul. 1988, pp. 493–497.

*Primary Examiner*—Shrive Beck
*Assistant Examiner*—Michael Barr
*Attorney, Agent, or Firm*—Wenderoth, Lind & Ponack, L.L.P.

[57] ABSTRACT

The resistance of tableware decorations to cutlery scratches can be improved by using a decoration coloring substance whose coloring component is a molecular sieve charged with a metal selected from V, Cr, Mn, Fe, Co, Ni, Cu, Zn, Ag, Au, Ru, Rh, Pd, Os, Ir, Pt and/or an ion or a compound of the metal. The coloring component is preferably an aluminosilicate or silicalite charged with Au, Pt, Pd or Cu.

8 Claims, No Drawings

PROCESS FOR THE PRODUCTION OF DECORATED TABLEWARE WITH INCREASED RESISTANCE TO SCRATCHES CAUSED BY CUTLERY

BACKGROUND OF THE INVENTION

The invention relates to a process for the production of colored ceramic material, for example tableware, decorations which have an increased resistance to the formation of traces of wear (scratches) caused by cutlery.

The production of colored decorations on ceramic materials, such as, for example tableware made of earthenware, bone china and porcelain, is known per se (see Ullmann's Enzyklopädie der technischen Chemie, 4th Edition. Vol. 14 (1977), pp. 9–10). By means of highly diverse application techniques, such as painting, immersion, spraying, and in particular direct or indirect imprinting, a decoration coloring substance is applied in the form of a decoration onto the material to be decorated and subsequently fired in.

Decoration coloring substances comprise substantially a coloring component, conventionally a pigment, and a glass flux conventionally containing one or more glass frits. In the case of tableware decorations, it is necessary to differentiate between on-glaze and in-glaze decoration. In general, after glaze firing, a decoration is applied onto the tableware part to be decorated, for example, by means of direct printing or indirect printing (transfer pattern technique), and subsequently fired in. In the case of an on-glaze decoration either normal firing at approximately 780 to 900° C. or high-temperature quick firing at temperatures above 900° C. to approximately 1100° C., is used. In the case of an in-glaze decoration firing is conducted at temperatures in the range of approximately 1100 to 1250° C.

Porcelain tableware, in particular hotel and restaurant porcelain, is subjected to high stress through alkaline washwater of dish washing machines and through the effect of cutlery during use. Cutlery effects on decorated tableware parts lead to gray abrasion traces, which interfere with the aesthetic impression. Such abrasion traces caused by metal cutlery are especially disturbing in large-area decorations which are increasingly in demand by the market. Until now, this problem could only be solved partially through an in-glaze decoration wherein the decoration becomes partially submerged in the glaze layer during the firing.

SUMMARY OF THE INVENTION

Accordingly, it is an object of the invention to provide a way of increasing the resistance of the decorations to cutlery abrasion traces.

This object can be achieved by a process for the production of decorated ceramic material, for example tableware, with increased resistance to cutlery abrasion traces, comprising application onto the tableware of a decoration coloring substance comprising a coloring component and a glass flux, and firing-in the decoration, which is characterized in that, as the coloring component, a molecular sieve charged with at least one metal selected from V, Cr, Mn, Fe, Co, Ni, Cu, Zn, Ag, Au, Ru, Rh, Pd, Os, Ir, Pt and/or an ion or a compound of the metal is used.

DETAILED DESCRIPTION OF THE INVENTION

Particular decoration coloring substances which can be used in the present invention are those such as described in DE 197 09 100.8, the entire disclosure of which is incorporated herein.

Thus, in the decoration coloring substance the colloidal metal and/or metal compound imparting the coloration, i.e. the colloidal metal and/or metal compound causing the color formation during the decoration firing, is fixed on or in a molecular sieve. Using an ionic metal compound, charging the molecular sieve can be carried out by means of ion exchange or, using a nonionic metal compound or a colloidal metal, by adsorption in or on the structure of the molecular sieve. A molecular sieve, initially charged with a metal compound, can also be converted by means of a succeeding calcination step such that the metal compound, due to the thermal decomposition which may also be combined with a reduction with hydrogen, can be converted to the form of colloidal metal or potentially also in the form of a metal oxide or another thermally stable metal compound. Colloidal metal, in particular colloidal gold and gold clusters, which may each be stabilized by ligands, can be used directly in the form of a solution in the production of the coloring components.

The molecular sieve is conventionally charged with 0.01 to 20 wt.% of metal or metal compound, in each case calculated as the metal. It is especially preferred that the molecular sieve comprises 0.5 to 5 wt.% of metal or metal compound, calculated as the metal.

According to a preferred embodiment a molecular sieve substantially charged with a metal selected from gold, palladium, platinum and copper is used as the coloring component. The term "substantially" indicates that, in addition to these metals, a relatively smaller amount of one or more tint-modifying metals, metal ions or metal compounds selected from V, Cr, Mn, Fe, Co, Ni, Zn, Ag, Cu as well as the precious metals can be present. In particular, preferred is the use of decoration coloring substances for pink-colored or purple-colored decorations, wherein the coloring component of the decoration coloring substance is a molecular sieve comprising elemental gold or a gold compound, which for modification of the color tint, for example of a red shift, can comprise, in addition, silver or a silver compound. For gray decorations a molecular sieve comprising palladium is preferably used.

The coloring component as incorporated into the decoration coloring substance can itself provide the color, for example, a purple-colored decoration coloring substance in the case colloidal gold is present, or the color can only be formed during firing from a precursor of the color, for example, through the thermal decomposition of a gold compound. If the molecular sieve contains one or several metals bound in ionic form or adsorbed in the form of metal compounds which are not decomposed into metals during the firing, it is also possible that, during the firing, pigments with a primary particle size far below the conventional size are formed therefrom. Such pigments are so fine that they contribute only negligibly to the generation of cutlery abrasion traces.

The supports in the molecular sieves for the coloring metal, metal ion or metal compound are preferably aluminosilicates, in particular aluminosilicates with an $SiO_2/Al_2O_3$ ratio of 10 to 100, such as ZSM 5 or Zeolite-Beta, low-aluminum or aluminum-free silicalites, titanium-containing silicalites, such as TS-1, TS-2, or Ti-beta-zeolite, ferrosilicates and mesoporous silicates.

The glass flux of the decoration coloring substance can be composed in any desired way and is conventionally present as finely divided glass frit. A person skilled in the art can, for example, select the composition from the broad spectrum offered on the market. It is preferable to select such compositions which are matched with respect to the substrate to be decorated and the temperature of the firing so that no decoration errors, for example due to different coefficients of expansion of the glass flux and the substrate, occur.

In the case of decoration coloring substances according to the invention, the weight ratio of glass flux to color-imparting components is generally in the range between 20 and 0.2, preferably in the range between 10 and 1. The precise ratio depends on the color intensity of the color-imparting components and the desired color intensity of the decoration to be produced therewith.

Decoration coloring substances are applied in the form of a liquid or a paste, for example by means of conventional painting and printing techniques, including the technique of employing transfer pictures. Accordingly, the decoration coloring substances may additionally comprise a liquid medium. Such media, for example printing media, in general comprise as main components one or several organic binding agents and one or several solvents, among them water as well as conventional water-soluble and water-insoluble organic solvents.

The production of the decoration coloring substances preferably comprises the steps:
(i) impregnation of a molecular sieve with a solution or dispersion of a metal compound or a colloid of the metal or a liquid metal compound of one or more metals from the group V, Cr, Mn, Fe, Co, Ni, Cu, Zn, Ag, Au, Ru, Rh, Pd, Os, Ir and Pt,
(ii) if a solvent is present, drying, or drying and calcining, of the charged molecular sieve, and
(iii) thorough homogenization of the charged and optionally calcined molecular sieve with a glass flux.

The application of the decoration onto the tableware comprises known measures, for example, pasting-on the decoration coloring substance, printing and firing. The decoration is preferably applied onto glazed porcelain and fired in at temperatures in the range of 1000 to 1250° C., in particular 1100 to 1250° C.

The increased resistance to cutlery abrasion traces effected by the invention is attributed to the fact that, on the surface of the baked-in decoration, no or only extremely small, and thus few abrasion-causing pigment crystals which, due to their hardness and thus abrasive effect are responsible for the cutlery abrasion traces, project from the surface. The particle size of the coloring substances in the fired-in decoration, preferably of the precious metals selected from Au, Pd, Pt, and Cu, is in the manometer range, and thus no longer has any abrasive effect. The skeleton structure of the molecular sieve collapses during firing, in the process in which the decoration is melted on, and forms a component of the glass flux. Consequently, no discrete crystals causing abrasion of the coloring components of the decoration coloring substances project from the surface of the decoration. Comparison experiments below show that decoration coloring substances to be used according to the invention, lead to a substantially lesser extent of cutlery abrasion traces than the use of decoration coloring substances of identical or similar color based on conventional color pigments.

EXAMPLES—GENERAL TEST CONDITIONS

The test plates to be analyzed were produced as follows:
1. Grinding of the decoration coloring substance in an ethanol/acetone mixture in a Bloch-Rosetti mill—120 minutes, 50 g material to be ground, 150 g grinding balls.

2. Pasting-on of the decoration coloring substance in a printing medium (No. 80820 by Cerdec AG)—10 parts by weight of decoration coloring substance and 6 parts by weight of medium.

3. Printing onto transfer pattern paper by means of 100-mesh Nylon screen; filming.

4. Decoration of porcelain plates by means of transfer patterns.

5. Firing: sliding-bat kiln, 90 minutes, 1140° C., and 1220° C.

Test parameters were (i) the dishwasher resistance and (ii) the resistance to abrasion by cutlery (abrasion test):

(i): 500 washing cycles according to DIN 50275 using a cleanser according to DIN 44990. Evaluation: 5=no impairment of luster, 4=slight decrease of luster, 3=slightly dull-bright, 2=dull-bright, 1=stone dull, no luster.

(ii): A blade of chrome steel (18% chromium) is guided 5 times flat scraping over the decoration surface; type and thickness of the metal abrasion are evaluated: 5=no abrasion traces, 4=abrasion traces which can be wiped away, 3=abrasion traces which cannot be completely removed by wiping, 2=strong, nonremovable abrasion traces, 1=very strong, nonremovable abrasion traces.

EXAMPLE 1 (E 1) AND COMPARISON EXAMPLE 1 (CE 1)

In E 1, a decoration coloring substance based on a lead-containing glass frit (No.90369 by Cerdec AG) and a gold-containing zeolite (ZSM 5) were used. The pigment volume concentration of the decoration coloring substance (PVC) was 50%.

The decoration coloring substance in CE 1 contained a lead-containing glass frit (No. 90234 by Cerdec AG) as a flux and a tin-antimony mixed oxide of average grain size $d_{50}=0.8$ μm and $d_{90}=2.8$ μm as coloring component; PVC 40%. The results are listed in the table below.

|  | E1 | | CE1 | |
| --- | --- | --- | --- | --- |
| Firing temperature (° C.) | 1140 | 1220 | 1140 | 1220 |
| Color | gray | | gray | |
| Dishwasher resistance | 2.5 | 2.5 | 1.5 | 1.5 |
| Abrasion traces | 2.5 | 2.5 | 2 | 2 |

By using a gray decoration coloring substance according to the invention, instead of a decoration coloring substance containing a conventional gray pigment, the resistance against abrasion traces caused by cutlery could be increased.

EXAMPLE 2 (E 2) AND COMPARISON EXAMPLE 2 (CE 2)

Pink colored decoration coloring substances are used—in each of E 2 a) to c) a color with a zeolite (ZSM 5) comprising colloidal gold, and in CE 2 a chromium-doped $CaSnSiO_5$ ($d_{50}$ approximately 4 μm). The composition and results are shown in the table below.

| | Example No. | | | |
|---|---|---|---|---|
| | E2 | | CE2 | |
| | a | b | c | |
| PVC (%) | 17 | 34 | 34 | 40 |
| Flux (No. by Cerdec AG) | 90295 | 90234 | 90347 | 90369 |
| Dishwasher resistance | 3.5/3.5 | 2/2 | 3/3.5 | 2  2 |
| Abrasion traces *) | 5/4.5 | 4/4.5 | 3/4.5 | 3  2 |

*) Values after firing at 1140° C./1220° C.

EXAMPLES 3 a) AND b) (E 3 a AND b) AND COMPARISON EXAMPLES 3 a) AND b) (CE 3 a AND b)

Gray decoration coloring substances with the fluxes and pigment volume concentrations (PVC) listed in the table below were used. In addition, the table lists the results of the abrasion tests (average values based on 3 determinations) with the test conditions being changed for the purpose of better reproduction, compared to the General Test Conditions given above. Firing in each instance took place in the sliding-bat kiln at 1180° C., 90 minutes.

| | No. | | | |
|---|---|---|---|---|
| | E 3a) | E 3b) | CE 3a) | CE 3b) |
| Coloring component | Pd zeolite (ZSM 5) | | tin-antimony mixed oxide | |
| Flux (No. of Cerdec AG) | 90234 | 90369 | 90234 | 90369 |
| PVC (%) | 28 | 47 | 28 | 47 |
| Abrasion test *) | 4.3 | 4.5 | 3.0 | 3.0 |

*) The abrasion test was carried out by means of a round WMF knife with 20 rotations/minute at sliding forward motion, an angle of 45° and a weight of 120 g. The evaluation was conducted according to the General Test Conditions above.

EXAMPLE 4 (E 4)

A decoration coloring substance containing 63 wt. % of a lead-containing glass frit (No. 90369 by Cerdec AG) and 47 wt. % of a gold-containing zeolite was tested. The PVC was 54 %. After pasting on and firing at 1180° C./90 minutes on a porcelain plate, the abrasion test according to Example 3 was carried out. The evaluation of the abrasion test was 5.0.

We claim:

1. A process for production of decorated ceramic material, which comprises applying to ceramic material a decoration coloring substance comprising (1) as a coloring component, a molecular sieve having a skeleton structure and charged with at least one member selected from the group consisting of V, Cr, Mn, Fe, Co, Ni, Cu, Zn, Ag, Au, Ru, Rh, Pd, Os, Ir and Pt metals, ions thereof and compounds thereof, and (2) a glass flux; and firing-in the applied decoration coloring substance so that the skeleton structure of the molecular sieve collapses and becomes a component of the glass flux.

2. The process as claimed in claim 1, wherein the ceramic material is tableware.

3. The process as claimed in claim 2, wherein the tableware is made of earthenware, bone china or porcelain.

4. The process as claimed in claim 1, wherein the molecular sieve is charged with a metal selected from the group consisting of Au, Pd, Pt and Cu.

5. The process as claimed in claim 1, wherein the ceramic material is glazed tableware and firing-in is conducted at 1000 to 1250° C.

6. The process as claimed in claim 5, wherein the glazed tableware is porcelain.

7. The process as claimed in claim 4, wherein the ceramic material is glazed tableware and firing-in is conducted at 1000 to 1250° C.

8. The process as claimed in claim 7, wherein the glazed tableware is porcelain.

* * * * *